Aug. 20, 1935.  R. C. HAWLEY  2,012,006
STEERING GEAR BRAKE
Filed May 22, 1933
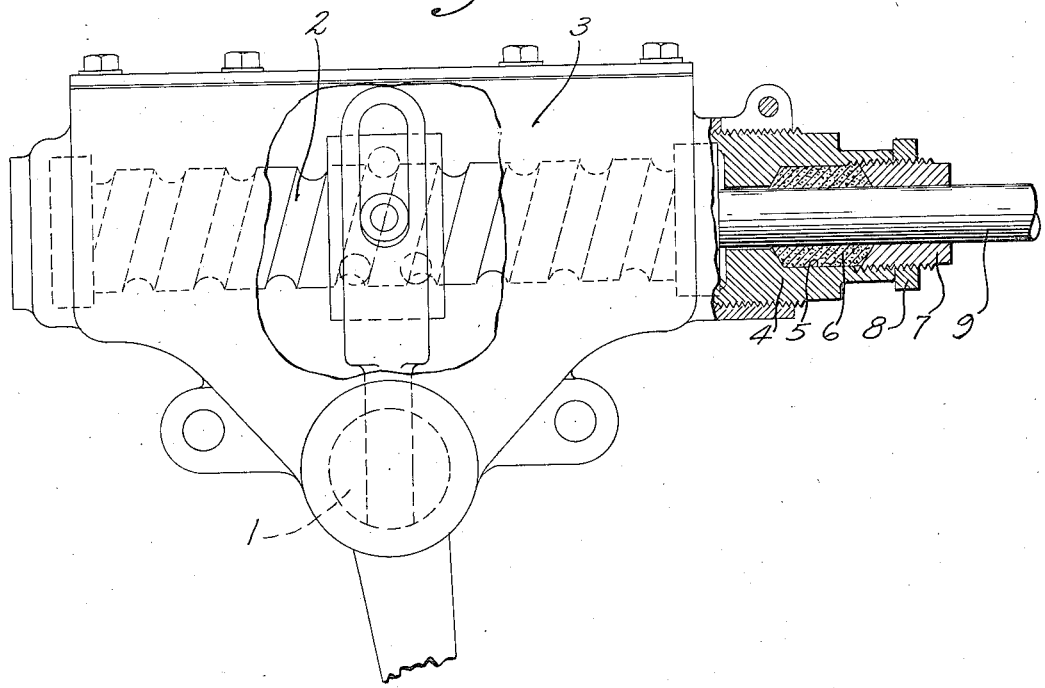
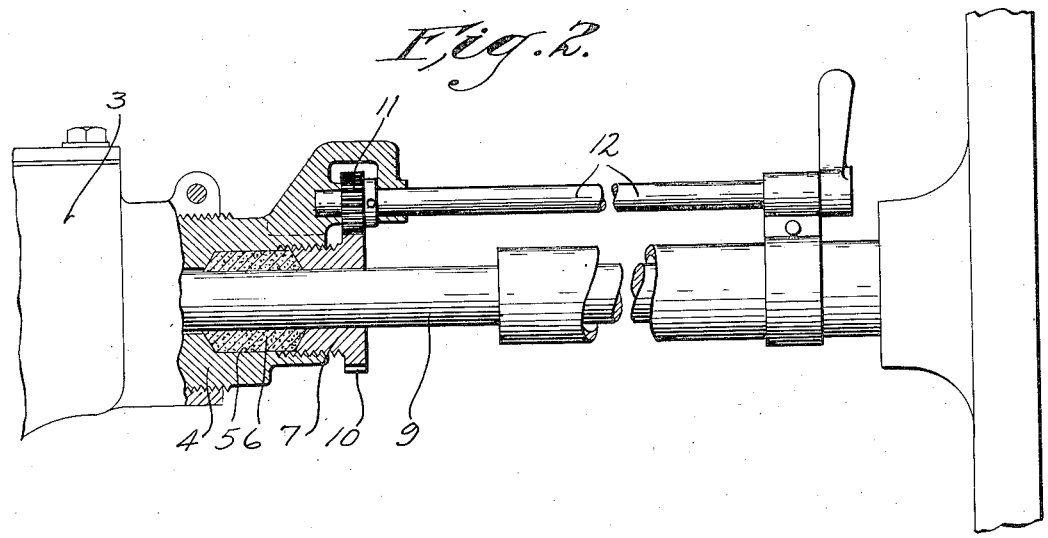
INVENTOR
Robert C. Hawley
BY
ATTORNEYS Patented Aug. 20, 1935

2,012,006

UNITED STATES PATENT OFFICE 2,012,006

STEERING GEAR BRAKE

Robert C. Hawley, Milwaukee, Wis., assignor to Lavine Gear Company, Milwaukee, Wis., a corporation of Wisconsin Application May 22, 1933, Serial No. 672,108

9 Claims. (Cl. 74—495)

This invention relates to improvements in steering gear brakes. The present application is a companion to application Serial No. 661,481 filed March 13, 1933 by B. Wickliffe Twyman.

It is the object of the invention to render a steering gear brake effective by applying it to the steering shaft as distinguished from the effect which may be produced by the same amount of resistance applied to the rock shaft or driven shaft of a steering gear.

In the present invention the braking resistance is effective through the reduction gearing of the steering mechanism and, assuming that such gearing has the usual ratio of 20 or 30 to 1, the friction will tend to make the gear absolutely irreversible by offering 20 or 30 pounds of resistance to rock shaft movement for each pound of resistance which is offered to the rotation of the steering shaft. The mechanical advantage of the steering wheel enables the operator readily to overcome the resistance applied to the shaft while at the same time such resistance reaches a very highly effective value in opposing any tendency of the wheels to straighten themselves during the rounding of a corner.

In tractors and road scrapers, and for other purposes, there is a demand for an absolutely irreversible steering gear which will remain fixed in any position to which the operator may adjust it. The present invention seeks to meet that demand by supplying a novel and simple form of brake mechanism which, with very little added weight, will have the desired action.

There is a further demand for a brake mechanism which can readily be adjusted. The present invention seeks to supply such a mechanism in two forms, one of which can be adjusted readily with proper tools and the other of which is instantly adjustable by means of a control which may be located on an instrument panel or at any convenient point on the vehicle.

In the drawing:

Figure 1 is a diagrammatic illustration of a steering gear showing its upper end portion in axial section to illustrate a preferred application of the steering gear brake thereto.

Figure 2 is a fragmentary detail view showing in axial section a modified embodiment of the invention in which remote control for the brake adjustment is provided.

Like parts are identified by the same reference characters throughout the several views.

While any desired form of brake may be employed I have, for the purposes of the present disclosure, selected one of the simplest brake constructions to illustrate the application of the invention to a conventional steering gear.

The usual driven steering gear rock shaft 1 may be driven from shaft 9 through a suitable reduction gearing generically designated by reference character 2 and disposed in the housing 3. The gearing 2 may correspond to that disclosed in the companion application above referred to. The upper end of the gearing housing 3, in place of the usual steering gear thrust adjusting screw, has a special thrust adjusting screw 4 provided with an internal recess at 5 in which any suitable leather or friction packing is disposed at 6. Thus, the adjusting screw 4 comprises the housing for the brake.

Threaded to thrust adjusting screw 4 is a brake adjusting screw 7 adapted variably to compress the packing material 6. The adjustment screw 7 is locked in place by the lock nut 8 when the desired adjustment has been made.

When the brake adjustment screw 7 has been turned up to subject the packing 6 to pressure, such packing is caused to bind upon a steering shaft 9 and to offer a frictional resistance to the rotation of shaft 9 which is proportioned to the pressure exerted by the plug or adjusting screw 7. While the packing 6 also serves to prevent the escape of grease from the steering gear, its primary function is that of a brake, and it has been found that under the degree of compression employed for brake purposes, the grease from the gear will not penetrate the packing for a sufficient distance to affect materially the braking friction offered thereby.

It will be obvious that for any mechanic the adjustment of braking pressure in a device of this character will require only a moment's time. There are, however, instances in which it is desirable that the braking pressure should be controlled from a remote point. For instance, in the normal operation of a vehicle along a straight road, full freedom of steering may be desired, but in rounding a corner it may be desirable to apply sufficient braking pressure so that the steering gear will remain fixed in any position to which it may be adjusted.

In order to accomplish this result simply and economically, I may form gear teeth at 10 upon the brake adjusting screw 7 and arrange a pinion 11 to be operated by a flexible shaft 12 to turn the adjusting screw 10 from any desired remote point, such as the instrument board of the vehicle. The ratio between the pinion 11 and the gear 10 on the adjusting screw will preferably be sufficiently high so that the flexible shaft will not be overtaxed and the drive will be so nearly irreversible that the lock nut may be dispensed with.

As shown in Fig. 1, the steering gear is provided with apertured ears by which it is commonly anchored to the frame of the car. In the average installation there is a support for the steering column but no means of resisting a torsional displacement thereof. Consequently it is of great advantage in the present construction to have the stationary brake element associate directly with the steering gear where its torque will be absorbed by the vehicle frame. As above noted, there is an additional advantage in having this particular kind of a braking means at this point, since the compressible material at 6 serves not only as a brake, but also as a packing.

I claim:

1. In a steering gear, the combination with a driving shaft, of a casing providing a packing gland about said shaft, friction packing within said gland, a compression device screw threaded to said casing and effective to compress said packing to control the friction thereof upon said shaft, a gear connected with said device, a pinion meshing with said gear, and a shaft provided with a remote handle for the rotation of said pinion in the adjustment of the braking action of said packing upon said shaft.

2. The combination with a steering gear housing provided with driving and driven shafts and means interconnecting said shafts within said housing, of a gland about the driving shaft directly upon the housing, a compressible packing in said gland bearing upon said shaft and adapted to offer frictional resistance to the rotation thereof, a packing nut for adjusting the pressure upon said packing, and remote means for operating said nut whereby to vary the frictional resistance to shaft rotation while maintaining the effectiveness of said packing to prevent loss of lubricant from said housing.

3. In a steering gear, the combination with a steering gear housing, of driving and driven shafts and means within said housing interconnecting said shafts, a sleeve-like extension about the driving shaft unitarily connected with said housing providing a packing gland, packing material within said gland of a nature to frictionally engage the driving shaft, a packing nut threaded to said extension, a steering column, a steering wheel at the end of said column connected with said driving shaft, means associated with the gear housing for rotating said nut, whereby to vary the compression of said packing and the frictional resistance thereof to shaft rotation, and means carried by said column adjacent said wheel provided with motion transmitting connections to said nut actuating means.

4. In a steering mechanism having reduction gearing between the driving shaft and the driven members, the combination with the rotatable driving shaft, of a relatively stationary housing adapted to retained lubricant about said gearing and forming a packing gland about said shaft, a compressible lubricant-retaining friction packing in said gland adapted to apply a variable braking pressure to the shaft when subjected to compression, and means for manually regulating the pressure upon said packing to predetermine its braking effect.

5. In a steering mechanism having reduction gearing between the driving shaft and the driven members, a compressible brake composed of packing material confined in contact with the shaft, and adjustable pressure means coacting with said packing and provided with remote control operating mechanism for manually predetermining the pressure of said material upon the shaft with reference to the desired braking effect.

6. In a steering mechanism having reduction gearing between the driving shaft and the driven members, a housing for such gearing, a compressible brake composed of packing material confined in contact with the shaft, and means for manually predetermining the pressure of said material upon the shaft with reference to the desired braking effect, said pressure predetermining means being subject to instant manual adjustment and comprising a pressure member freely movable respecting said housing, means whereby the movement of said member varies the pressure thereof on such material, and remote control connections upon which the movement of said member depends.

7. In a steering mechanism having reduction gearing between the driving shaft and the driven members, the combination with a relatively stationary driving shaft housing member, of a compressible brake of non-metallic material confined by said housing in contact with the shaft, an adjustable pressure applying member for predetermining the braking pressure of such material upon the shaft, a remote manually operable actuating member, and connections for transmitting motion therefrom to the pressure applying member, whereby instant variation in pressure may be accomplished from a point within convenient reach of the operator.

8. In a steering gear mechanism, the combination with shafting, gearing operatively connecting portions of the shafting, and a housing provided with bearings for said shafting portions, one of said portions being extended from said housing and provided with a steering wheel, of a brake mechanism including a friction element fixed with respect to said housing and applicable to said shafting at said housing, a pressure member acting on said element in a direction to determine a degree of engagement of said element with said housing, and means for adjusting said pressure member comprising remote control connections extending to the vicinity of said steering wheel.

9. A steering gear comprising the combination with a driving shaft having a steering wheel and a worm cam gear, of a driven shaft provided with a cam follower operatively connected with said worm cam gear, a housing provided with bearings for said shafts and arranged to enclose said worm cam gear and follower, braking means operatively arranged to act on the driving shaft at said housing and fixed with reference to said housing against rotative movement with said shaft, and means for adjusting said braking means radially of said shaft to vary the pressure thereof on said shaft, said adjusting means comprising remote control connections extending thereto from the vicinity of said steering wheel.

ROBERT C. HAWLEY.